(12) United States Patent
Mariadoss

(10) Patent No.: US 11,809,171 B2
(45) Date of Patent: Nov. 7, 2023

(54) VIRTUAL ASSISTANT FACTORY COMPUTING PLATFORM

(71) Applicant: Bank of America Corporation, Charlotte, NC (US)

(72) Inventor: ChellaPrabhu Andrew Mariadoss, Irvine, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/394,528

(22) Filed: Aug. 5, 2021

(65) Prior Publication Data

US 2023/0045599 A1 Feb. 9, 2023

(51) Int. Cl.
*G05B 19/418* (2006.01)

(52) U.S. Cl.
CPC ............... *G05B 19/41865* (2013.01); *G05B 2219/40131* (2013.01)

(58) Field of Classification Search
None
See application file for complete search history.

(56) References Cited

U.S. PATENT DOCUMENTS

| 8,019,698 | B1* | 9/2011 | Dryer | G06F 9/453 706/45 |
| 9,336,269 | B1 | 5/2016 | Smith et al. | |
| 9,424,345 | B1 | 8/2016 | Sanio et al. | |
| 9,729,592 | B2* | 8/2017 | Slayton | H04L 65/403 |
| 9,836,177 | B2 | 12/2017 | Brown et al. | |
| 10,353,906 | B2 | 7/2019 | Souche et al. | |
| 10,515,632 | B2 | 12/2019 | Gilbert | |
| 10,931,724 | B2* | 2/2021 | Unitt | H04L 67/56 |
| 2014/0310005 | A1 | 10/2014 | Brown et al. | |
| 2014/0365880 | A1 | 12/2014 | Bellegarda | |
| 2015/0007037 | A1 | 1/2015 | Butler et al. | |
| 2015/0066817 | A1* | 3/2015 | Slayton | G06N 5/04 706/11 |
| 2015/0073798 | A1 | 3/2015 | Karov et al. | |
| 2015/0186497 | A1 | 7/2015 | Patton et al. | |
| 2015/0215350 | A1* | 7/2015 | Slayton | G06F 9/453 709/204 |
| 2016/0142354 | A1 | 5/2016 | Inhitnah et al. | |
| 2016/0225187 | A1* | 8/2016 | Knipp | G06T 19/006 |
| 2017/0337195 | A1 | 11/2017 | Rinearson et al. | |

(Continued)

*Primary Examiner* — Jason Lin
(74) *Attorney, Agent, or Firm* — Banner & Witcoff, Ltd.

(57) ABSTRACT

Various aspects of the disclosure relate to a virtual assistant factory that supports back office operations within a computing system. Various internal services (e.g., banking services, user management services, and the like) may be accessible to external application via an application programming interface. In some cases, a virtual assistant factory computing platform may expose services that call on and/or are tied to various back office computing operations. The virtual assistant factory platform may spin up and host robots, controls, and/or processes that may supplement computing operations and other associated back office operations. The application interface may call API functions that may cause the virtual assistant factory to spin up a virtual assistant to perform various functions and interact with both the user and the appropriate back office operations and/or third-party computing systems.

20 Claims, 5 Drawing Sheets

(56) References Cited

U.S. PATENT DOCUMENTS

| | | |
|---|---|---|
| 2018/0061261 A1 | 3/2018 | Watkins, Jr. |
| 2018/0293484 A1* | 10/2018 | Wang .................... G06F 16/632 |
| 2019/0108044 A1* | 4/2019 | Coven ................. G06F 9/44505 |
| 2019/0369748 A1* | 12/2019 | Hindi ....................... G10L 15/22 |
| 2020/0065523 A1* | 2/2020 | Fukuda ................. H04L 51/046 |
| 2020/0143797 A1* | 5/2020 | Manoharan ............. G10L 15/16 |
| 2020/0351405 A1* | 11/2020 | Pace ................... G06F 11/3409 |
| 2021/0160373 A1* | 5/2021 | McGann ............. H04M 3/5175 |
| 2022/0210033 A1* | 6/2022 | Higgins ................. H04L 51/02 |

* cited by examiner

VIRTUAL ASSISTANT FACTORY COMPUTING PLATFORM

BACKGROUND

Enterprise organizations may utilize various computing infrastructure to transact business with their customers. In some instances, customers may desire assistance and/or may experience hardships when interacting with online services provided by the enterprise organizations. Detecting when a customer desires assistance or is experiencing hardship, and providing appropriate assistance to the customer, may be of high significance to an enterprise organization. In many instances, however, it may be difficult to ensure that virtual assistant robots (e.g., "bots") are available to provide an appropriate level of assistance by accessing various back office functionalities and/or services, while also attempting to optimize the resource utilization, bandwidth utilization, and efficient operations of the computing infrastructure involved in maintaining, accessing, and executing such activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with automatically providing appropriate levels of virtual assistance to users performing various activities and/or interacting with automated services provided by an enterprise computing system. In particular, one or more aspects of the disclosure relate to use of application programming interfaces (APIs) for communicating between customer facing applications and back office services to automate a virtual assistant factory based on identified user needs.

Aspects of the disclosure relate to providing a virtual assistant factory that supports back office operations. Within a consumer servicing shared solutions space, there is a need to open up various internal services (e.g., banking services, user management services, and the like) via externally-accessible APIs. In some cases, a virtual assistant factory computing platform may expose services (e.g., banking as a service (BaaS) computer functions) that call on and/or are tied to various back office computing operations. For example, such a factory may spin up and host robots, controls, and/or processes that may supplement computing operations (e.g., payment transactions, address change functionality, and the like) and other associated back office operations. In an illustrative example, a customer may request an address change on one or more accounts through an application interface. The application interface may call API functions that may cause the virtual assistant factory to spin up a virtual assistant bot to perform various functions and interact with both the user and the appropriate back office operations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a virtual assistant factory computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
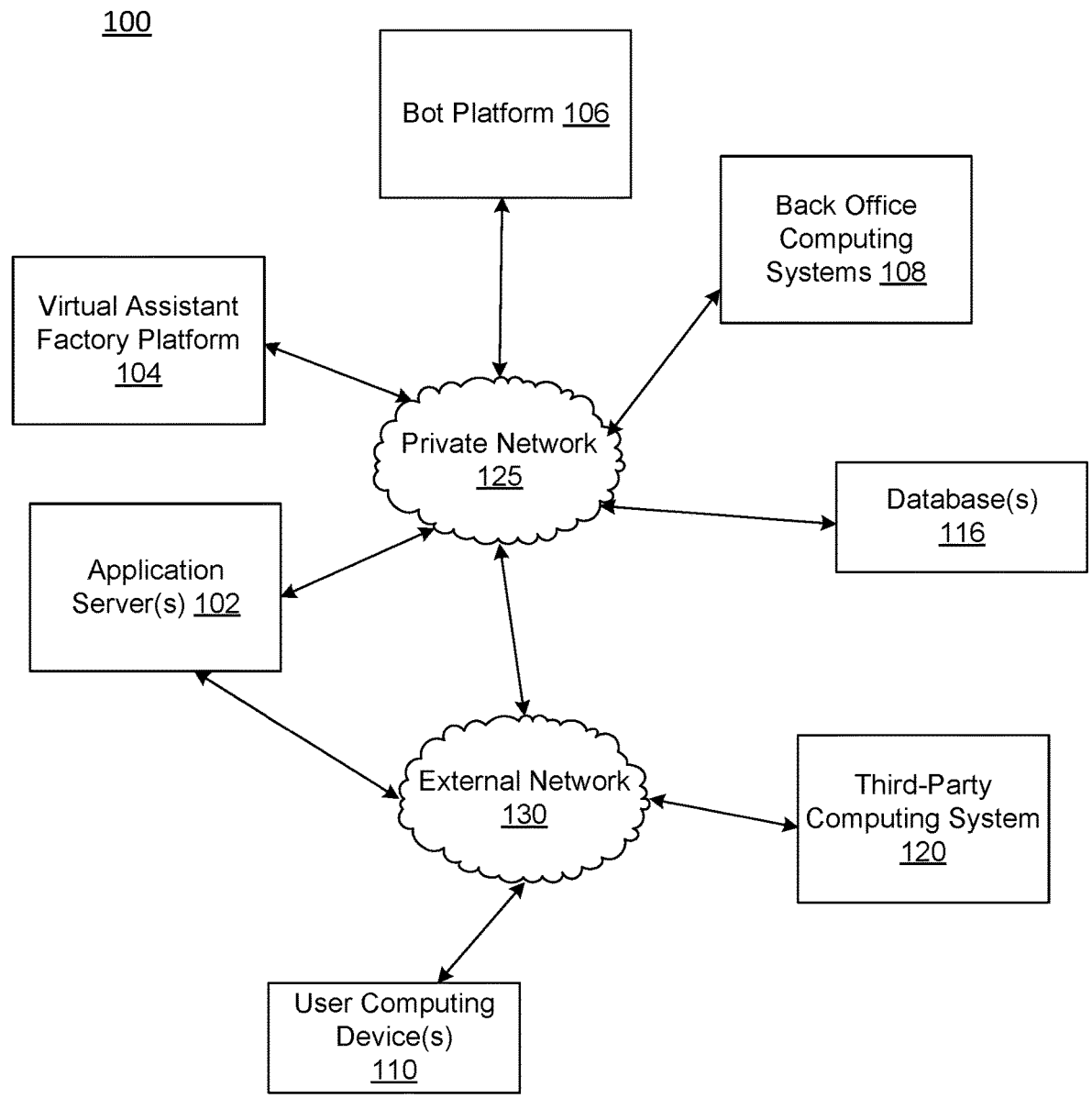
FIG. 1A shows an illustrative computing environment providing virtual assistant robot automation management, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Enterprise organizations, such as financial institutions, have increasingly been providing computing functionality online as products or services. Increasingly financial institutions have been providing electronic services or processes (e.g., an application programming interface (API), banking as a service (BaaS) functionality, and the like) where the licensed financial organizations (e.g., banks, brokerages, and the like) may integrate their digital services directly into the products of other non-financial service-licensed businesses. APIs may be used by in-house applications and/or third-party applications and/or web interfaces to interact with computing functions provided by an enterprise organization. In this way, contracting businesses, such as a car dealer, an airline and the like, can offer customers digital services such as mobile bank accounts, debit cards, loans and payment services, without needing to acquire a banking license of their own. The financial institution may a provide application programming interface (API), webhooks, and/or the like where a third-party may be leverage the API interface to allow their customers to access online products and/or services, normally offered through financial institutions, directly from the third-party website or application. In high touch applications, both provided by the enterprise organization and through integration of API accessible functionality through a third-party application or web site, a user may require assistance while they are interacting with the functionality provided by the enterprise organization (e.g., banking functionality, and the like). In some cases, the enterprise organizations may have bots (e.g., virtual agents, virtual assistants, and the like) waiting in the background to perform certain functionality as needed by a user. In some cases, the bots may be configured to assist with synchronous functionality (e.g., a transaction request) and/or asynchronous functionality (e.g., customer service functionality).

In some cases, a bot factory management system may also include functionality to perform different levels of interaction, from simple autonomous functions (e.g., an address change associated with a customer account) to more complex functionality (e.g., account management functions associated management of an account associated with a deceased individual) where coordination with one or more individuals and/or computing systems may be required. For example, a virtual assistant bot may be caused to be spun up by a virtual assistant factory computing platform to support functionality for deceased individual account management, such as by interfacing with an estate servicing organization and facilitating interaction with one or more back end services and/or third-party computing platforms. Normally, once an individual passes away, a surviving individual may need to personally call or interact with a large number of different organizations to settle accounts and/or provide notification of the passing of the individual. Instead, the virtual assistant factory computing platform may spin up a bot to collect the relevant information about the deceased individual and may process the information with respect to the enterprise organization's back end systems to update all accounts and/or information associated with that individual. Additionally, the virtual assistant bot, as configured by the virtual assistant factory computing platform, may facilitate user interaction to walk the surviving individual through a similar process with other third-party organizations, either automatically for third-organizations integrating BaaS functionality and/or via higher level functionality to facilitate interaction with humans with other third-party organizations (e.g., customer service personnel).

In some cases, illustrative levels of virtual assistant functionality that may be enabled by the virtual assistant factory computing platform based on the functionality may be classified in levels, but other terms may be used. For example, level one functionality may be associated with simple functionality that may be performed automatically by a virtual assistant bot, such as updating information in a computing database (e.g., an address change, filling in a form). Level two functionality may be more complex functionality where a bot would need to support a higher level of functions to interact with other humans, outside computing systems and the like (e.g., filing of a form with an internal or external system and providing feedback whether the form was filed successfully). In some cases, level two functionality may require chaining of different lower level functionality, such as filling in a form, filing the form, and providing information regarding next steps to the user. Illustrative level three functionality may require the virtual assistant bot to be spun up with capabilities for additional human interface support, such as to help with low level functionality (e.g., form filling, changing information) and to use that information to assist an individual when additional human assistance is required. For example, the virtual assistant factory computing platform may cause a bot to be spun up with functionality to provide technical support with a third-party website integrating BaaS functionality. For example, the virtual assistant bot may be configured to assist an individual through technical issues associated with the enterprise organization functionality (e.g., banking functions and associated technical support), while for third-party assistance, the virtual assistant bot may initiate contact automatically to a third-party customer assistance organization or virtual assistant.

FIG. 1A shows an illustrative computing environment 100 for providing virtual assistant robot automation management, in accordance with one or more arrangements. The computing environment 100 may comprise one or more devices (e.g., computer systems, communication devices, and the like). The computing environment 100 may comprise, for example, one or more application server(s) 102, a virtual assistant factory platform 104, a bot platform 106, one or more back office computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a third party computing system 120 and one or more user devices 110 connected, via a public or external network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The virtual assistant factory platform 104 may comprise one or more computing devices and/or other computer components (e.g., processors, memories, communication interfaces) configured to perform one or more functions as described herein. Further details associated with the architecture of the virtual assistant factory platform 104 are described with reference to FIG. 1B.

The application servers 102 may comprise one or more computing devices and/or other computer components (e.g., processors, memories, communication interfaces). In addition, the application servers 102 may be configured to host, execute, and/or otherwise provide one or more enterprise applications. In an arrangement where the private network 125 is associated with a financial institution (e.g., a bank), the application servers 102 may be configured, for example, to host, execute, and/or otherwise provide one or more transaction processing programs, such as an online banking application, fund transfer applications, and/or other programs associated with the financial institution. The application servers 102 may comprise various servers and/or databases that store and/or otherwise maintain account information, such as financial account information including account balances, transaction history, account owner information, and/or other information. In addition, the application servers 102 may process and/or otherwise execute transactions on specific accounts based on commands and/or other information received from other computer systems comprising the computing environment 100. In some cases, the enterprise application host platform may be configured, for example, to host, execute, and/or otherwise provide one or more transaction processing programs, such as electronic fund transfer applications, online loan processing applications, and/or other programs associated with the financial institution.

The bot platform 106 may comprise one or more computing devices and/or other computer components (e.g., processors, memories, communication interfaces). In some cases, the bot platform may incorporate a bot framework and/or other tools to build, test, deploy, and/or manage intelligent bots. In some cases, the bot framework may be configured as a modular interface to spin up bots independently and may include tools, templates, and/or related AI services to facilitate bot instantiation and/or configuration. In some cases, the bot platform, when a command is received form the virtual assistant factory platform may create bots that use speech, understand natural language, handle questions and answers, and the like.

The back-office computing systems 108 may include one or more host devices (e.g., a workstation, a server, and the like) or mobile computing device (e.g., smartphone, tablet). In addition, an administrative computing device may be linked to and/or operated by a specific enterprise user (who may, for example, be an employee or other affiliate of the enterprise organization) who may have administrative privileges to perform various operations within the private network 125. In some cases, the back office computing systems may include a user authentication system that may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights. For example, an application may require a passcode or facial recognition for login purposes and may require voice recognition and/or may verify a location of access, a time of day of access and/or may rely on learned patterns of activity of the associated user to allow access to a second functionality.

The third party computing system 120 may comprise one or more computing devices and/or other computer components (e.g., processors, memories, communication interfaces). The third-party computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the third-party computing system 120 is for processing an electronic exchange of goods and/or services. The third-party computing system 120 may be associated with a specific goods purchasing activity, such as purchasing a vehicle, transferring title of real estate may perform communicate with one or more other platforms within the third-party computing system 120.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the virtual assistant factory platform 104. For example, the database(s) 116 may store a listing of accounts that may be potentially associated with compliance issues (e.g., accounts associated with geographical areas that are not serviced by the financial institution, accounts subject to sanctions by a regulatory authority, etc.). In an arrangement, the database(s) 116 may be used for other purposes as described herein.

In one or more arrangements, the virtual assistant factory platform 104, the application servers 102, the bot platform 106, the back-office computing systems 108, the third-party computing system 120, the user devices 110, and/or the other devices/systems in the computing environment 100 may be any type of computing device capable of receiving input via a user interface, and communicating the received input to one or more other computing devices in the computing environment 100. For example, virtual assistant factory platform 104, the application servers 102, the bot platform 106, the back-office computing systems 108, the third-party computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the virtual assistant factory platform 104, the application servers 102, the bot platform 106, the back-office computing systems 108, the third-party computing system 120, the user devices 110, and/or the other devices/systems in the computing environment 100 may, in some instances, be and/or comprise special-purpose computing devices configured to perform specific functions.

Figure 1B:
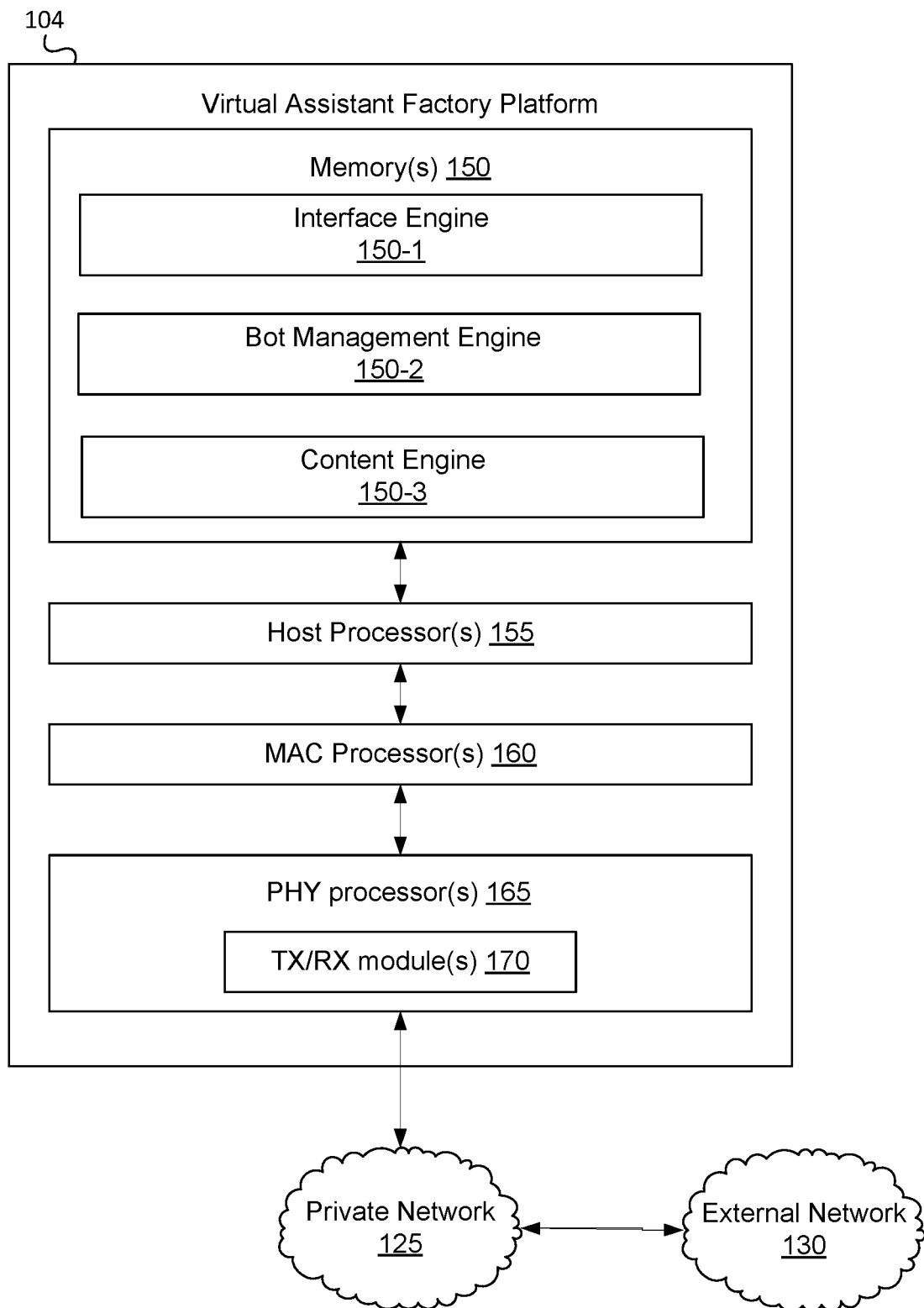
FIG. 1B shows an illustrative computing platform enabled for virtual assistant robot automation management, in accordance with one or more aspects described herein.

FIG. 1B shows an illustrative virtual assistant factory computing platform 104 in accordance with one or more examples described herein. The virtual assistant factory platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The virtual assistant factory platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the virtual assistant factory platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the check generation service platform 104 may be configured to execute machine readable instructions stored in memory 150. The memory 150 may comprise (i) one or more program modules/engines having instructions that when executed by the one or more processors cause the check generation service platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the virtual assistant factory platform 104 and/or by different computing devices that may form and/or otherwise make up the virtual assistant factory platform 104. For example, the memory 150 may have, store, and/or comprise an interface engine 150-1, a bot management engine 150-2, and/or a content engine 150-3. The interface engine 150-1 may have instructions that direct and/or cause the virtual assistant factory platform 104 to perform one or more operations associated with communicating with a user to identify information corresponding to a user activity and/or a user request for a service to be performed (e.g., as submitted by an application or web script via an API). The bot management engine 150-2 may have instructions that may cause the virtual assistant factory platform 104 to generate spin up, instantiate or otherwise generate a virtual assistant bot to interact with the user and assist with an identified user action or function desired to be performed. The content engine 150-3 may facilitate communication between the bot management engine 150-2, one or more third party computing systems 120 and/or one or more back-office computing systems 108, via one or more networks 125, 130

While FIG. 1A illustrates the virtual assistant factory platform 104, the application servers 102, the bot platform 106, the back-office computing systems 108, as being separate elements connected in the private network 125, in one or more other arrangements, functions of one or more of the above may be integrated in a single device/network of devices. For example, elements in the virtual assistant factory platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the bot platform 106, and/or the back-office computing systems 108.

Figure 2:
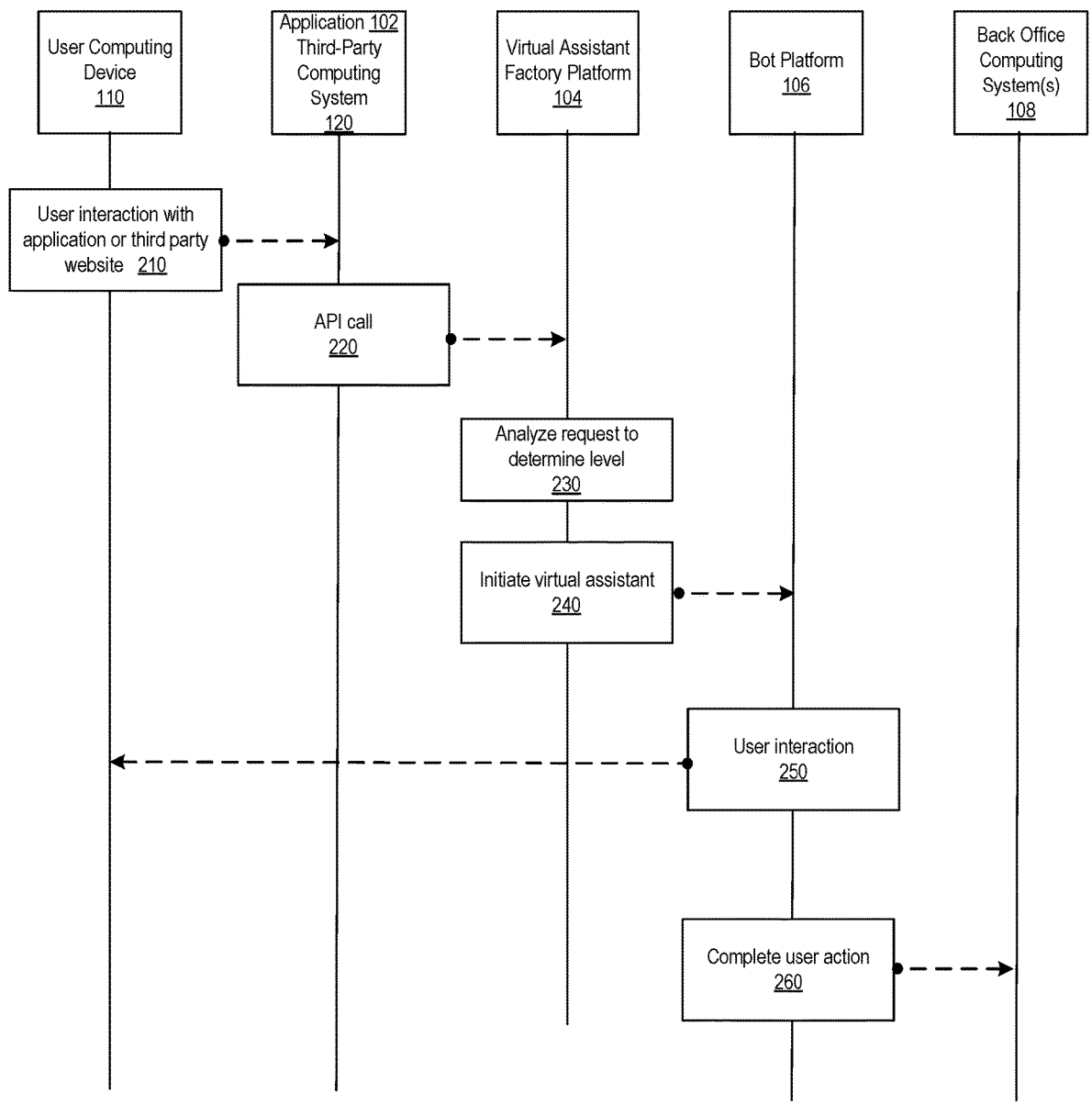
FIGS. 2, 3, and 4 show illustrative event sequences for automatic control of a virtual assistant factory, in accordance with one or more example arrangements.
Figure 3:
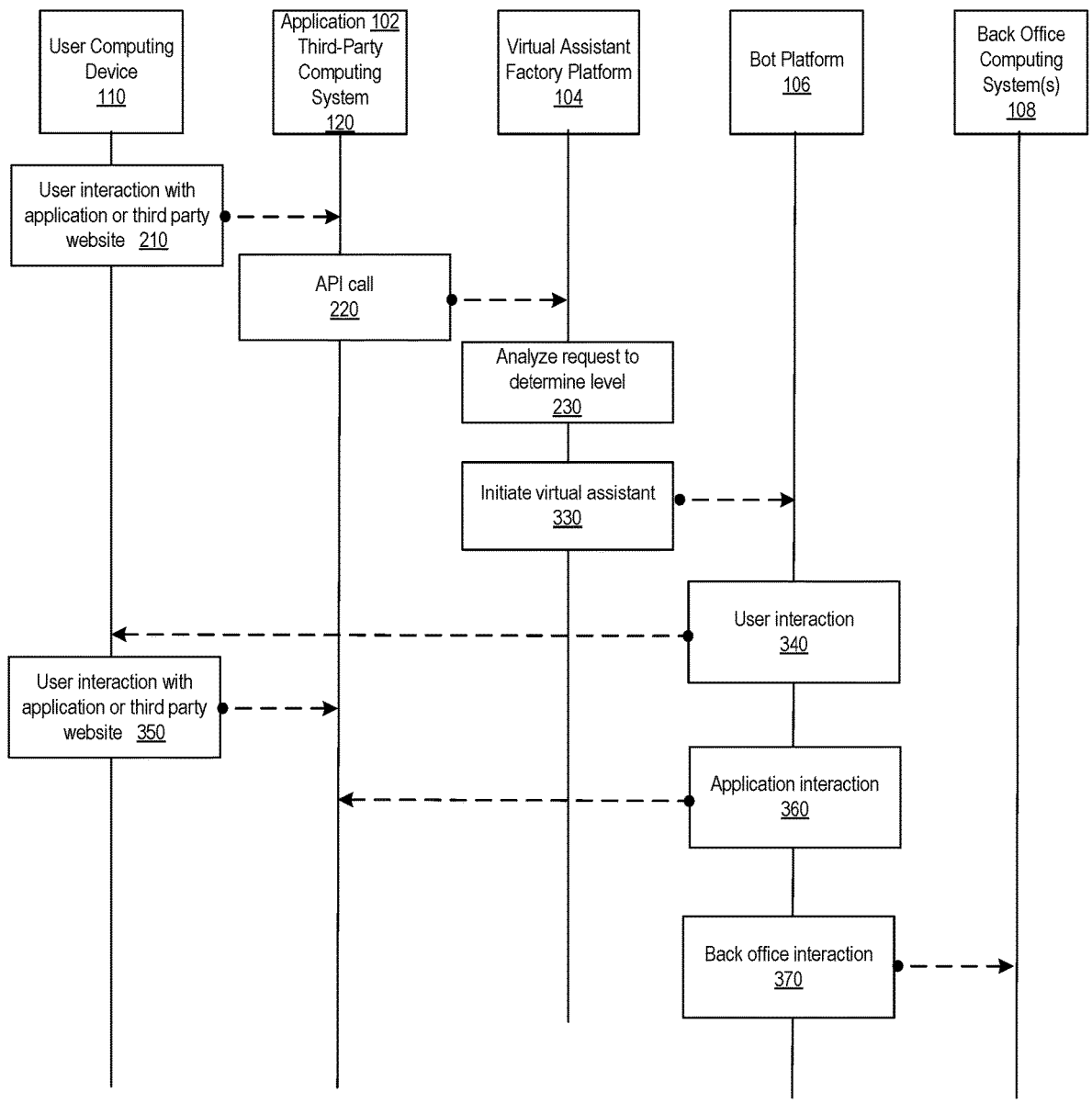
Figure 4:
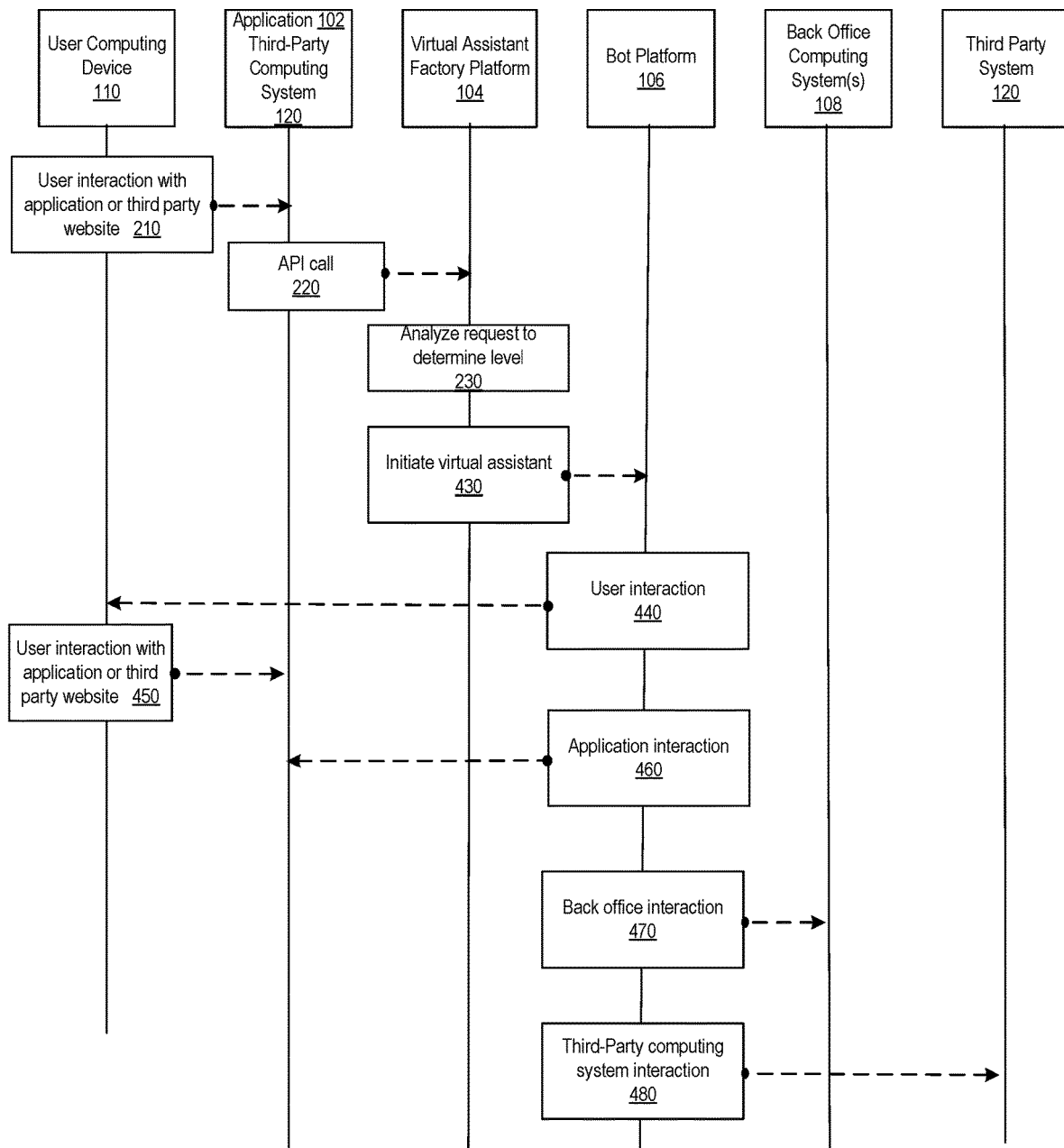

FIGS. 2-4 show illustrative event sequences for automatic control of a virtual assistant factory, in accordance with one or more illustrative arrangements. The user computing device 110 may be used for user interaction with one or more applications and/or websites utilizing one or more functionalities and/or services provided by the enterprise computing system. For example, the application may be an application 102, such as a banking application that facilitates electronic access to one or more user accounts to allow the user to manage information and/or perform one or more electronic transactions. Additionally, the enterprise application may allow a user to perform other activities utilizing functionality provided through the back-end computing systems. In some cases, third party websites may incorporate BaaS functionality by integrating API function calls to allow the third-party to provide banking services via computing functionality provided by the enterprise computing system and/or back office computing systems 108. For example, the third-party computing system 120 may integrate API function calls to allow the third party to provide banking functions via API calls and to leverage computing functionality of the back office computing systems 108 and/or virtual assistant functionality provided by the virtual assistant factory platform 104 and the bot platform 106.

FIG. 2 shows an illustrative user interaction with an application 102 and/or a third-party computing system 120 via a website leveraging API functionality. At 210, a user of the user device 110 may initiate a request that may be facilitated by a virtual assistant. For example, at 210, the user may provide input to request an address change action to be performed by the application 102 and/or the third-party computing system 120. In such cases, the application 102 (or the website), at 220, may call a function to communicate a virtual assistant request to the virtual assistant factory platform 104, such as via one or more function calls and/or via an API function call. At 230, the virtual assistant factory platform 104 may analyze the function call and/or the virtual assistant request information to identify a level of assistance required, such that a virtual assistant of an appropriate level may be called. By managing the complexity levels and instantiating an appropriate virtual assistant, computing resources may be managed to reduce processing times and/or processing power. For example, for a simple request, such as an address change, the virtual assistant factory platform 104 may assign a low complexity level to the request (e.g., level 1). At 240, the virtual assistant factory platform 104 may trigger the bot platform 106 to instantiate and activate a level 1 virtual assistant to perform the function (e.g., the address change). At 250, the virtual assistant may connect to the user via the application 102 and/or the third-party computing system's website service. Here, the level 1 virtual assistant may prompt the user to enter the data, check the data for errors (format errors, and the like) and may complete the user action at 260, for example, by communicating the data (e.g., the address change information) to the appropriate back office computing system 108 for storage in a database 116. Upon an identified completion of the requested user action, the virtual assistant factory platform 104 may trigger the bot platform 106 to wind down the instance of the virtual assistant.

FIG. 3 shows an illustrative user interaction with an application 102 and/or a third-party computing system 120 via a website leveraging API functionality for request of a medium complexity level (e.g., level 2). At 210, a user of the user device 110 may initiate a request that may be facilitated by a virtual assistant. For example, at 210, the user may provide input to request an electronic trade action to be performed by the application 102 and/or the third-party computing system 120. In such cases, the application 102 (or the website), at 220, may call a function to communicate a virtual assistant request to the virtual assistant factory platform 104, such as via one or more function calls and/or via an API function call. At 330, the virtual assistant factory platform 104 may analyze the function call and/or the virtual assistant request information to identify a level of assistance required, such that a virtual assistant of an appropriate level may be called. Here, because an electronic trade may require more user assistance and/or the virtual assistant may utilize additional functionality provided by the application 102 or third-party website. Here, for an electronic trade request, the virtual assistant factory platform may assign a medium complexity (e.g., level 2) to the request. At 340, the virtual assistant factory platform 104 may trigger the bot platform 106 to instantiate and activate a level 2 virtual assistant to perform the function (e.g., the electronic trade request). At 340, the virtual assistant may connect to the user via the application 102 and/or the third-party computing system's website service to initiate data gathering for the electronic trade request, such as by presenting a user interface screen and/or a form to facilitate entry of desired trade terms (e.g., a monetary amount, a number of shares, a financial product identifier, and the like). Additionally, the level 2 virtual assistant may interact with the application 102 or website to facilitate display of additional information in response to and based on information received from the user interaction at 350. In an illustrative example, the virtual assistant may cause the application 102 to present a user interface screen with user accounts from which the user may choose, financial product information and/or comparison charts, and the trade entry information such that the virtual assistant may walk the user through the electronic transaction creation and execution processes. At 370, the virtual assistant may update the back office computing systems 108 with the information obtained through the process, such as by submitting the trade to via an electronic trading exchange service. Upon an identified completion of the requested user action, the virtual assistant factory platform 104 may trigger the bot platform 106 to wind down the instance of the virtual assistant.

FIG. 4 shows an illustrative user interaction with an application 102 and/or a third-party computing system 120 via a website leveraging API functionality for request of a high complexity level (e.g., level 3). At 210, a user of the user device 110 may initiate a request that may be facilitated by a virtual assistant. For example, at 210, the user may provide input to request assistance in wrapping up matters within one or more computing systems for a deceased individual. In some cases, such actions may be performed by the application 102 and/or the third-party computing system 120 and may allow for such information to be communicated to external computing systems. In such cases, the application 102 (or the website), at 220, may call a function to communicate a virtual assistant request to the virtual assistant factory platform 104, such as via one or more function calls and/or via an API function call. At 430, the virtual assistant factory platform 104 may analyze the function call and/or the virtual assistant request information to identify a level of assistance required, such that a virtual assistant of an appropriate level may be called. Here, because settling an estate of a deceased individual may require complex interactions with one or more computing systems and/or application, the virtual assistant may utilize additional functionality provided by the application 102 or third-party website and/or may facilitate communication to external computing systems and/or may initiate calls to humans, when necessary, to complete an action.

At 440, the virtual assistant triggered by the bot platform 106 may initiate user interaction with the user at the user computing device 110, such as via the application 102 or website. Here, the virtual assistant may collect information regarding other actions to be performed and may analyze the information to suggest additional computing systems that may require update. For example, the virtual assistant may prompt a user for account information, and/or other information associated with the deceased user and my cause import of electronic scans of paperwork or other digital documents. For example, the virtual assistant may initiate digital capture of a death certificate and/or may import a digital version of such documents. From the entered information, the virtual assistant may analyze this information to identify one or more external computing systems and/or digital accounts that may require update, such as by analyzing digital records from a bill pay account, such as by accessing the information through interaction with the application 102 at 460. At 470, the virtual assistant may access functionality of one or more back office computing systems 108, such as to verify an uploaded document, verify a user identity, update user information, and/or the like. At 480, the virtual assistant may communicate one or more electronic requests to external computing systems, such as by sending a message (e.g., an email, text message, instant message, physical letter and the like) to one or more third party systems, to initiate actions on behalf of the user of the user device 110. For example, the virtual assistant may initiate a call (e.g., telephone call, video conference, and the like) between the user device 110 and a customer service representative associated with a third-party computing system 120. In some cases, the virtual assistant may capture information during the call or from messages, with permission from the user, to be analyzed to complete a form or memorialize a conversation. Upon an identified completion of the requested user action, the virtual assistant factory platform 104 may trigger the bot platform 106 to wind down the instance of the virtual assistant.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a user device presenting a user interface screen comprising an input to trigger generation of an action request;
a virtual assistant factory platform communicatively coupled to the user computing device, comprising:
at least one first processor; and
first memory storing computer-readable instructions that, when executed by the at least one first processor, cause the virtual assistant factory platform to:
receive, via the input and from the user computing device via a network, the action request;
determine, based on the action request and information associated with the action request, a complexity of the action request, wherein a determination of the complexity of the action request comprises a determination of a level of support required to be provided by a virtual assistant in performance of the action request and wherein the level of support required to be provided by the virtual assistant corresponds to a level of required coordination between a plurality of computing systems to autonomously perform a desired action;
trigger, based on the complexity of the action request and by a virtual assistant platform, instantiation of the virtual assistant of a type capable of performing functionality corresponding to the complexity of the action request;
initiate, based on an analysis of user interaction with the instantiation of the virtual assistant, additional functionality, actions with additional computing systems; and
trigger, based on an indication of completion of the action request, the virtual assistant platform to deactivate the virtual assistant.

2. The system of claim 1, wherein the action request comprises an update of data and wherein the instructions cause the virtual assistant factory platform to:
determine the complexity of the action request to be low; and
spin up a level one virtual assistant capable of autonomously completing the action request via one of a plurality of lower level actions.

3. The system of claim 1, wherein the action request comprises data entry via a user device and interaction with an application via the user device, and wherein the instructions cause the virtual assistant factory platform to:
determine the complexity of the action request to be medium; and
spin up a level two virtual assistant capable of supporting a higher level of functions comprising interactions with humans and outside computing systems.

4. The system of claim 1, wherein the action request comprises interaction with at least one external computing system via a network, and wherein the instructions cause the virtual assistant factory platform to:
determine the complexity of the action request to be high; and spin up a level three virtual assistant capable of supporting low level functionality and to using that information to assist an individual replacing additional human assistance, wherein the additional human assistance comprises automatically initiating contact with a third party system.

5. The system of claim 1, wherein the instructions cause the virtual assistant factory platform to communicate to the user device via application programming interface (API) function calls.

6. The system of claim 1, wherein the user device comprises an application and wherein the virtual assistant communicates with the user via a user interface provided by the application.

7. The system of claim 1, further comprising the virtual assistant platform comprising:
a second processor; and
second memory storing second instructions that, when executed by the second processor, cause the virtual assistant platform to:
analyze, based on a complexity level, input received from the user device; and
initiate communication, via a network, between the user device and a third-party computing device; and
monitor communications between the user device and the third-party computing device; and
initiate, based on the communications, an action performed by a back-office computing system.

8. A method comprising:
generating, on a user interface of a user device, an input to trigger generation of an action request;
receiving, by a virtual assistant factory platform via the input and from the user computing device via a network, the action request;
determining, based on the action request and information associated with the action request, a complexity of the action request, wherein a determination of the complexity of the action request comprises a determination of a level of support required to be provided by a virtual assistant in performance of the action request and wherein the level of support required to be provided by the virtual assistant corresponds to a level of required coordination between a plurality of computing systems to autonomously perform a desired action;
triggering, based on the complexity of the action request and by a virtual assistant platform, instantiation of a virtual assistant of a type capable of performing functionality associated with the action request; and
triggering, based on an indication of completion of the action request, the virtual assistant platform to deactivate the virtual assistant.

9. The method of claim 8, wherein the action request comprises an update of data and wherein the method further comprises determining the complexity of the action request to be low and spinning up a level one virtual assistant capable of autonomously completing the action request by performing one of a plurality of lower level actions.

10. The method of claim 8, further comprising determining, by the virtual assistant factory platform based on the action request comprising data entry via a user device and interaction with an application via the user device, that the complexity of the action request is medium; and
spinning up a level two virtual assistant capable of supporting a higher level of functions comprising interactions with humans and outside computing systems.

11. The method of claim 8, wherein the action request comprises interaction with at least one external computing system via a network, and wherein the method further comprises causing the virtual assistant factory platform to determine the complexity of the action request to be high; and
spinning up a level three virtual assistant capable of supporting low level functionality and to using that information to assist an individual replacing additional human assistance, wherein the additional human assistance comprises automatically initiating contact with a third party system.

12. The method of claim 8, comprising causing the virtual assistant factory platform to communicate to the user device via application programming interface (API) function calls.

13. The method of claim 8, wherein the user device comprises an application and wherein the virtual assistant communicates with the user via a user interface provided by the application.

14. The method of claim 8, further comprising:
analyzing, by the virtual assistant platform based on a complexity level, input received from the user device; and
initiating communication, via a network, between the user device and a third-party computing device to complete a user action.

15. The method of claim 14 further comprising:
monitoring communications between the user device and the third-party computing device; and
initiating, based on the communications, an action performed by a back-office computing system.

16. Non-transitory computer readable media storing instructions that, when executed by a processor, cause a computing device to:
receive, via an input and from a user computing device via a network, an action request;
determine, based on the action request and information associated with the action request, a complexity of the action request, wherein a determination of the complexity of the action request comprises a determination of a level of support required to be provided by a virtual assistant in performance of the action request and wherein the level of support required to be provided by the virtual assistant corresponds to a level of required coordination between a plurality of computing systems to autonomously perform a desired action;
trigger, based on the complexity of the action request and by a virtual assistant platform, instantiation of a virtual assistant to perform functionality associated with the action request; and
trigger, based on an indication of completion of the action request, the virtual assistant platform to deactivate the virtual assistant.

17. The non-transitory computer readable media of claim 16, wherein the action request comprises an update of data and wherein the instructions cause the computing device:
determine the complexity of the action request to be low; and
spin up a level one virtual assistant capable of autonomously completing the action request by performing a lower level action.

18. The non-transitory computer readable media of claim 16, wherein the action request comprises data entry via a user device and interaction with an application via the user device, and wherein the instructions cause the computing device to:
determine the complexity of the action request to be medium; and spin up a level two virtual assistant capable of supporting a higher level of functions comprising interactions with humans and outside computing systems.

19. The non-transitory computer readable media of claim 16, wherein the action request comprises interaction with at least one external computing system via a network, and wherein the instructions cause the computing device to:
   determine the complexity of the action request to be high; and
   spin up a level three virtual assistant capable of supporting low level functionality and to using that information to assist an individual replacing additional human assistance, wherein the additional human assistance comprises automatically initiating contact with a third party system.

20. The non-transitory computer readable media of claim 16, wherein the instructions cause the computing device to communicate to the user device via application programming interface (API) function calls.

\* \* \* \* \*